(12) United States Patent
Anderson et al.

(10) Patent No.: US 9,303,104 B2
(45) Date of Patent: Apr. 5, 2016

(54) PHOTOPOLYMERISATION PROCESSES AND NOVEL COMPOUNDS THEREFOR

(71) Applicant: Lambson Limited, Leeds, Yorkshire (GB)

(72) Inventors: David George Anderson, Yorkshire (GB); Kevin Harper, Yorkshire (GB); Alan Thomas Rose, Yorkshire (GB); Petr Sehnal, Yorkshire (GB)

(73) Assignee: LAMBSON LIMITED, Yorkshire (GB)

( * ) Notice: Subject to any disclaimer, the term of this patent is extended or adjusted under 35 U.S.C. 154(b) by 0 days.

(21) Appl. No.: 14/417,192

(22) PCT Filed: Jul. 17, 2013

(86) PCT No.: PCT/GB2013/051914
§ 371 (c)(1),
(2) Date: Jan. 26, 2015

(87) PCT Pub. No.: WO2014/016567
PCT Pub. Date: Jan. 30, 2014

(65) Prior Publication Data
US 2015/0203609 A1    Jul. 23, 2015

(30) Foreign Application Priority Data
Jul. 24, 2012 (GB) .................................. 1213163.7

(51) Int. Cl.
| | | |
|---|---|---|
| *C08F 2/46* | (2006.01) | |
| *C08F 2/50* | (2006.01) | |
| *C08G 61/04* | (2006.01) | |
| *C08F 22/10* | (2006.01) | |

(52) U.S. Cl.
CPC .. *C08F 22/10* (2013.01); *C08F 2/50* (2013.01)

(58) Field of Classification Search
USPC .................. 522/8, 7, 6, 71, 189, 184, 1; 520/1
See application file for complete search history.

(56) References Cited

U.S. PATENT DOCUMENTS

| | | | |
|---|---|---|---|
| 5,723,512 A | 3/1998 | Leppard et al. | |
| 7,196,228 B2 | 3/2007 | Wolf et al. | |
| 7,705,065 B2 | 4/2010 | Belelie | |
| 8,324,256 B2 * | 12/2012 | Domschke et al. | ........... 514/359 |
| 8,633,258 B2 | 1/2014 | Bishop | |

OTHER PUBLICATIONS

International Search Report and Written Opinion for PCT/GB2013/051914 dated Oct. 16, 2013 (12 pages).

* cited by examiner

*Primary Examiner* — Ling Choi
*Assistant Examiner* — Jessica E Whiteley
(74) *Attorney, Agent, or Firm* — Micheal Best & Friedrich LLP

(57) ABSTRACT

A process for photopolymerizing a photopolymerizable compound having at least one ethylenically unsaturated double bond, comprises contacting said photopolymerizable compound with a photoactive oxide and irradiating it, wherein the photoactive oxide includes one or more moieties together with a moiety wherein there are at least 2 atoms between moiety I and moiety II in the additive and where X represents an oxygen or sulphur atom. Novel compounds which exhibit beneficial effects on cure in the presence of oxygen, which may be especially advantageous when LEDs are used, are also described.

17 Claims, 2 Drawing Sheets

PHOTOPOLYMERISATION PROCESSES AND NOVEL COMPOUNDS THEREFOR

This invention relates to photopolymerisation processes and novel compounds therefor and particularly, although not exclusively, relates to photopolymerisable compounds having at least one ethylenically unsaturated double bond.

Phosphine oxides are well known photoinitiators for the photopolymerisation of ethylenically unsaturated compounds. These include acylphosphine oxides such as:
(a) Laromer 819 (also known as Irgacure, 819 or BAPO), namely bis-(2,4,6-trimethylbenzoyl)phenyl phosphine oxide) which has the structure:

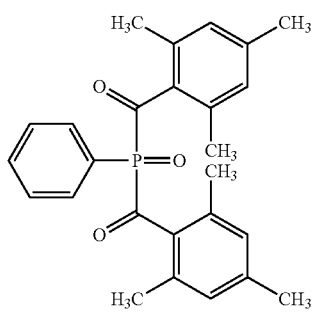 [SMILES: Cc1cc(C)c(C(=O)P(=O)(C(=O)c2c(C)cc(C)cc2C)c2ccccc2)c(C)c1]

(b) Speedcure TPO, (also known as 2,4,6-trimethylbenzoyl diphenyl phosphine oxide) which has the structure:

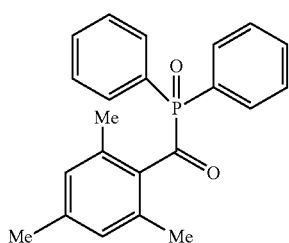 [SMILES: Cc1cc(C)c(C(=O)P(=O)(c2ccccc2)c2ccccc2)c(C)c1]

(c) Speedcure TPO-L (also known as Ethyl (2,4,6-trimethylbenzoyl)phenyl phosphinate) which has the structure:

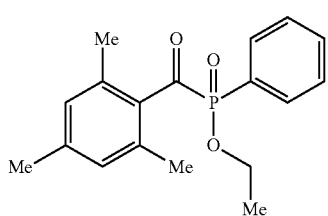 [SMILES: CCOP(=O)(C(=O)c1c(C)cc(C)cc1C)c1ccccc1]

Whilst these materials are excellent at facilitating depth cure in coatings, they all are susceptible to inhibition of surface cure by oxygen. When mercury lamps are used as the source of radiation, additives such as α-hydroxyacetophenones can be used to bring about surface cure. When Light Emitting Diodes (LED) are used however, because these are only readily available at acceptable cost in wavelengths down to 365 nm, (typical commercial LEDs being 365, 395 and 405 nm light sources), then the use of α-hydroxyacetophenones does not facilitate surface cure because the UV absorption of these materials is quantised at shorter wavelength i.e. higher energy than the light emitted by the LEDs.

The aforementioned problem in the context of LEDs is slowing down the use of LEDs in curing of coatings based on acrylates. It is an object of the present invention to address this problem.

This invention provides novel compounds which exhibit beneficial effects on cure in the presence of oxygen, which may be especially advantageous when LEDs are used.

According to a first aspect of the invention, there is provided a process for photopolymerising a photopolymerisable compound having at least one ethylenically unsaturated double bond, which comprises contacting said photopolymerisable compound with a photoactive oxide and irradiating it, wherein the photoactive oxide includes one or more moieties

            I together with a moiety

            II wherein there are at least 2 atoms between moiety I and moiety II in the additive and where X represents an oxygen or sulphur atom.

Preferably, X represents an oxygen atom and suitably therefore defines a phosphine oxide.

Preferably, there are at least 3, more preferably at least 4 atoms between moiety I and moiety II. Preferably, there are 6 or fewer, more preferably 5 or fewer atoms between moiety I and moiety II. Preferably, there are exactly 4 atoms between moiety I and moiety II.

Preferably, there are at least 3, more preferably at least 4 carbon atoms between moiety I and moiety II. Preferably, there are 6 or fewer, more preferably 5 or fewer carbon atoms between moiety I and moiety II. Preferably, there are exactly 4 carbon atoms between moiety I and moiety II.

Unless otherwise stated, optional substituents described herein include halogen atoms, especially chlorine atoms, and alkyl, acyl, nitro, cyano, alkoxy, hydroxy, amino, alkylamino, sulphinyl, alkylsulphinyl, sulphonyl, alkylsulphonyl, sulphonate, amido, alkylamido, alkoxycarbonyl, halocarbonyl and haloalkyl groups.

Unless otherwise stated, alkyl, alkenyl or alkynynl groups may have up to ten carbon atoms, preferably up to seven carbon atoms, more preferably up to four carbon atoms. Preferred alkyl groups include methyl and ethyl groups.

Preferably, 1 or more, more preferably 2 or more, especially 3 or more unsaturated carbon atoms are arranged between moiety I and moiety II.

Preferably, a carbonyl moiety is arranged between moiety I and moiety II.

Preferably, an aromatic, for example a benzene moiety is arranged between moiety I and moiety II.

Said photoactive oxide preferably includes a moiety of formula

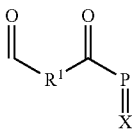

wherein $R^1$ represents a benzene moiety. The C=O moiety at the left hand side of formula III is suitably moiety II and the P=X moiety is moiety I. Preferably, X represents an oxygen atom.

Preferably, moiety III is part of a moiety

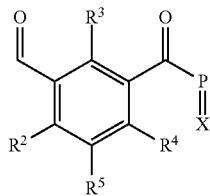

wherein $R^2$, $R^3$, $R^4$ and $R^5$ independently represent hydrogen, halogen, $C_{1-20}$ alkyl, $OR_6$, $CF_3$ or two of radicals $R^2$, $R^3$, $R^4$ and $R^5$ together form $C_{1-20}$ alkylene which can be interrupted by O, S or $NR^7$, wherein $R^6$ is hydrogen, $C_{1-20}$ alkyl, $C_{2-20}$ alkenyl, $C_3$-$C_8$ cycloalkyl, phenyl, benzyl or $C_{2-20}$ alkyl which is interrupted once or more than once by O or S and which is unsubstituted or is substituted by OH and/or SH, wherein $R^7$ is hydrogen, phenyl, $C_{1-12}$ alkyl or $C_{2-12}$ alkyl which is interrupted once or more than once by O or S and which is unsubstituted or substituted by OH and/or SH. X preferably represents an oxygen atom.

Preferably, $R^2$, $R^3$, $R^4$ and $R^5$ independently represent hydrogen, $C_{1-20}$ alkyl, $OR_6$, $CF_3$ or halogen.

Preferably, $R^2$, $R^3$, $R^4$ and $R^5$ independently represent hydrogen, $C_{1-10}$ alkyl, $OR_6$ wherein $R_6$ is hydrogen or $C_{1-10}$ alkyl, $CF_3$ or halogen.

Preferably, $R^3$, $R^4$, $R^5$ and $R^5$ independently represent hydrogen or $C_{1-20}$ alkyl, preferably $C_{1-10}$, more preferably $C_{1-5}$, especially $C_{1-2}$ alkyl.

Preferably $R^2$, $R^3$ and $R^4$ independently represent $C_{1-20}$, preferably $C_{1-10}$, more preferably $C_{1-5}$, especially $C_{1-2}$ alkyl. Preferably, $R^5$ represents a hydrogen atom.

$R^2$, $R^3$ and $R^4$ may be the same or different but preferably represent the same atom or group.

Preferably, $R^2$, $R^3$ and $R^4$ represent methyl and $R^5$ represents hydrogen.

Preferably, moiety IV is part of a moiety

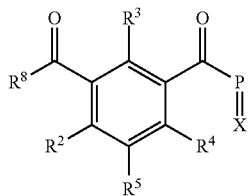

wherein $R^2$, $R^3$, $R^4$ and $R^5$ are described above and $R^8$ is a phenyl moiety optionally-substituted by $C_1$-$C_{18}$alkyl, $C_2$-$C_6$ alkenyl, phenylvinyl, $C_1$-$C_8$alkyl which is mono- or poly-substituted by phenyl, $C_2$-$C_5$alkoxycarbonyl, halogen, $C_1$-$C_{12}$ alkoxy, phenoxy, $C_1$-$C_{12}$alkylthio or phenylthio, $C_5$-$C_{10}$ cycloalkyl which is unsubstituted or substituted by $C_1$-$C_{12}$ alkyl, phenyl, phenoxy, $C_1$-$C_{12}$alkoxy, $C_2$-$C_5$alkoxycarbonyl, $C_1$-$C_4$alkylthio or halogen, $C_6$-$C_{12}$ aryl which is unsubstituted or mono- or poly-substituted by $C_1$-$C_{12}$ alkyl, $C_1$-$C_{12}$alkoxy, $C_1$-$C_{12}$alkoxyalkyl, $C_1$-$C_4$alkylthio or halogen, or a monovalent 5-membered or 6-membered heterocyclic radical containing one or more O, S or N atoms, which radical can be mono- or poly-substituted by halogen, $C_1$-$C_4$alkyl or $C_1$-$C_4$alkoxy.

$R^8$ is preferably an optionally-substituted aromatic group or heteroaromatic group. Preferably, $R^8$ does not include heteroatoms. $R^8$ may be a phenyl, polyphenyl or polyaromatic hydrocarbyl. $R^8$ may be a phenyl or polyphenyl. It is preferably a phenyl group, especially an unsubstituted phenyl group.

In preferred embodiments as described, an aromatic ketone is suitably covalently bound to one or all of the phenyl groups attached to phosphorus, thus giving rise to a second photoactive unit in the molecule which has its photo-absorption in a different part of the spectrum to the preferred phosphine oxide. In the case of these aromatic ketones, the photoactivity is through a so called Type 2 mechanism, that of proton abstraction from a suitable synergist such as a tertiary amine. This gives rise to a process of radical formation which is much less sensitive to oxygen inhibition than the radical forming process in an acyl phosphine oxide which is a Type 1 mechanism; that is it gives rise to free radicals by the scission of the (OP)—(C=O) aryl bond.

Preferably, $R^8$ represents an optionally substituted phenyl group. Preferably $R^8$ represents an unsubstituted phenyl group.

Preferably, moiety III is part of a moiety

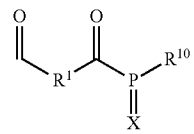

wherein $R^{10}$ is optionally-substituted phenyl. Such a phenyl may be unsubstituted or substituted by $C_{1-20}$ alkyl, alkoxy, alkenyloxy, cycloalkoxy, phenyl, benzyl, halogen or $C_{2-20}$ alkyl which is interrupted once or more than once by non-consecutive oxygen atom(s) and which can be substituted by OH and/or SH.

$R^{10}$ preferably represents an unsubstituted phenyl group. X preferably represents an oxygen atom.

Preferably, moiety III is part of a moiety

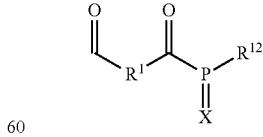

wherein $R^{12}$ is optionally-substituted benzyl, $C_{1-20}$ alkyl carbonyl, $C_1$-$C_{18}$alkyl, $C_2$-$C_{18}$alkenyl, $C_1$-$C_5$alkyl which is monosubstituted or polysubstituted by phenyl, ($C_1$-$C_{12}$alkyl)-phenyl, halogenophenyl, ($C_1$-$C_{12}$alkoxy)-phenyl, cyano, $C_2$-$C_5$alkoxycarbonyl, $C_1$-$C_{12}$alkoxy or halogen, $C_5$-$C_5$cycloalkyl, $C_6$-$C_{12}$aryl which is unsubstituted or mono- or poly-substituted by halogen, $C_1$-$C_{12}$alkyl or $C_1$-$C_{12}$alkoxy, a 5-membered or 6-membered heterocyclic monovalent radical which contains one or more O, S or N atoms and which may contain a fused benzo radical or is unsubstituted or substituted by $C_1$-$C_4$alkyl, $C_1$-$C_4$alkoxy or halogen.

Preferably $R^{12}$ is selected from $C_{1-18}$alkyl, $C_{1-12}$alkoxy, phenyl, $C_{1-12}$alkylcarbonyl, optionally-substituted benzyl and optionally-substituted phenyl.

More preferably, $R^{12}$ is selected from $C_{1-6}$ (preferably $C_{1-4}$, more preferably $C_{1-2}$) alkoxy, phenyl and optionally-substituted benzyl.

$R^{12}$ may be a moiety

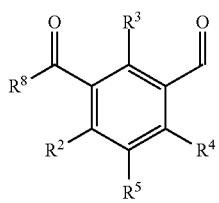

VIII which is linked by the carbonyl at the right hand side of VIII to the P=X moiety and wherein $R^2$, $R^3$, $R^4$, $R^5$ and $R^8$ are as described for moiety V above. Where the photoactive oxide includes both structures V and VIII, the structure is suitably symmetrical about the P=X moiety and/or suitably $R^2$, $R^3$, $R^4$, $R^5$ and $R^8$ of moiety VIII represent the same atoms or groups as for $R_2$, $R_3$, $R_4$, $R_5$ and $R_8$ of moiety V.

$R^{12}$ is preferably selected from phenyl, alkoxy (especially methoxy or ethoxy) or a moiety of formula VIII wherein $R^2$, $R^3$ and $R^4$ are methyl, $R^5$ is hydrogen and $R^8$ is benzyl.

Said photoactive oxide is preferably of formula

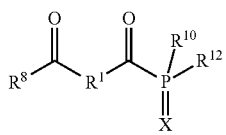

IX wherein $R^1$, $R^8$, $R^{10}$ and $R^{12}$ are as described herein and X preferably represents an oxygen atom.

More preferably, said photoactive oxide is of formula

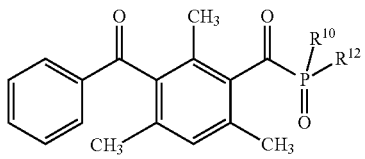

X wherein $R^{10}$ is preferably phenyl, $R^{12}$ is preferably selected from phenyl, alkoxy (especially methoxy or ethoxy) or a moiety of formula VIII wherein $R^2$, $R^3$ and $R^4$ are methyl, $R^5$ is hydrogen and $R^8$ is benzyl.

In an alternative embodiment, said photoactive oxide may be of formula

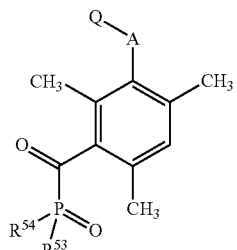

wherein moiety A is a direct link, or represents C=O, $(CH_2)n$ wherein n is 1 to 30, $CH_2C=O$, $CH_2O$, $OCH_2$, and Q represents optionally-substituted (e.g. un-substituted) phenyl when A represents C=O; when A represents a direct link or one of the other linking groups (except C=O), Q suitably represents $R^{50}COR^{51}$— or a thioxanthyl group, wherein $R^{50}$ and $R^{51}$ represent optionally-substituted (e.g. un-substituted) aryl moieties.

$R^{53}$ and $R^{54}$ may independently represent un-substituted phenyl groups or optionally-substituted phenyl groups. They may independently represent un-substituted phenyl groups or substituted phenyl groups of formula

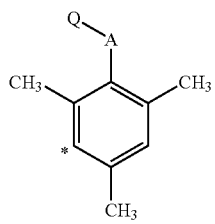

where Q and A are as described above and the starred carbon atom represents the position of attachment of the moiety to the phosphorus atom.

Suitable photoactive oxides may be selected from:

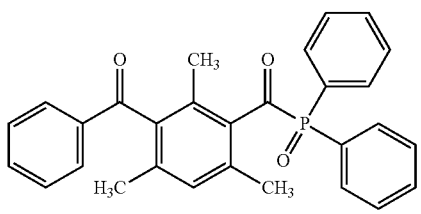

(3-benzoyl-2,4,6-trimethylphenyl)(diphenylphosphoroso)methanone

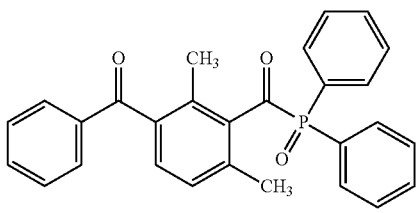

(3-benzoyl-2,6-dimethylphenyl)(diphenylphosphoroso)methanone

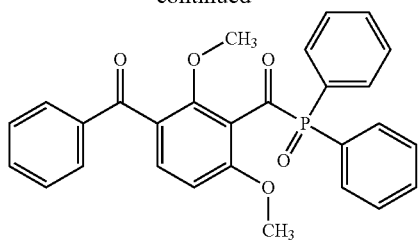

(3-benzoyl-2,6-dimethoxyphenyl)(diphenylphosphoroso)methanone

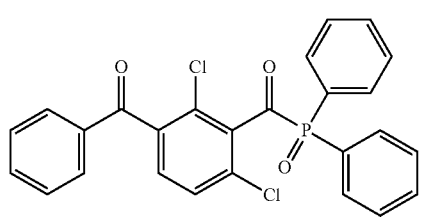

(3-benzoyl-2,6-dichlorophenyl)(diphenylphosphoroso)methanone

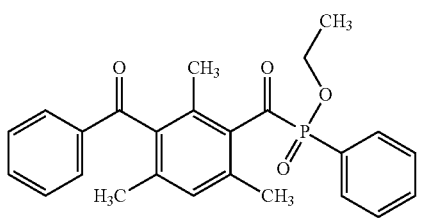

ethyl [(3-benzoyl-2,4,6-trimethylphenyl)carbonyl](phenyl)phosphinate

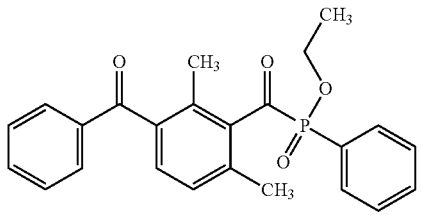

ethyl [(3-benzoyl-2,6-dimethylphenyl)carbonyl](phenyl)phosphinate

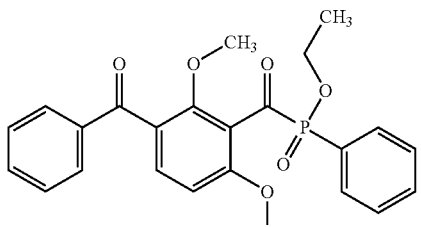

ethyl [(3-benzoyl-2,6-dimethoxyphenyl)carbonyl](phenyl)phosphinate

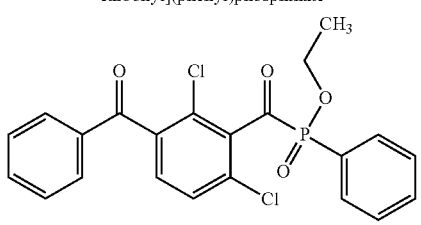

ethyl [(3-benzoyl-2,6-dichlorophenyl)carbonyl](phenyl)phosphinate

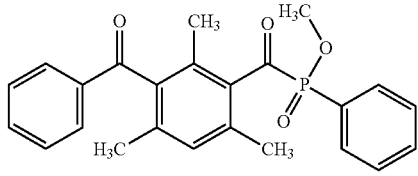

methyl [(3-benzoyl-2,4,6-trimethylphenyl)carbonyl](phenyl)phosphinate

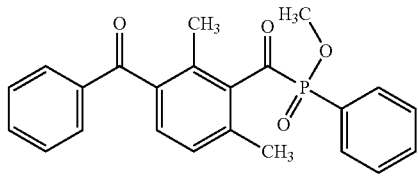

methyl [(3-benzoyl-2,6-dimethylphenyl)carbonyl](phenyl)phosphinate

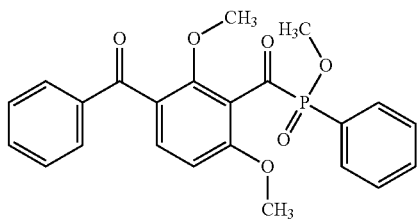

methyl [(3-benzoyl-2,6-dimethoxyphenyl)carbonyl](phenyl)phosphinate

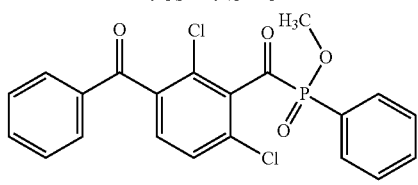

methyl [(3-benzoyl-2,6-dichlorophenyl)carbonyl](phenyl)phosphinate

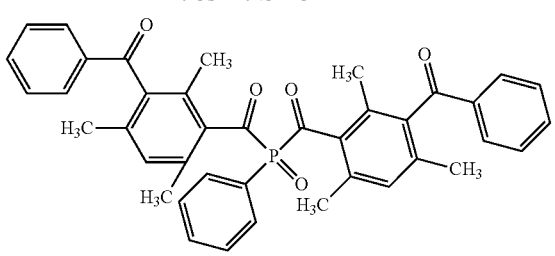

(3-benzoyl-2,4,6-trimethylphenyl)({[(3-benzoyl-2,4,6-trimethylphenyl)carbonyl](phenyl)phosphoryl})methanone

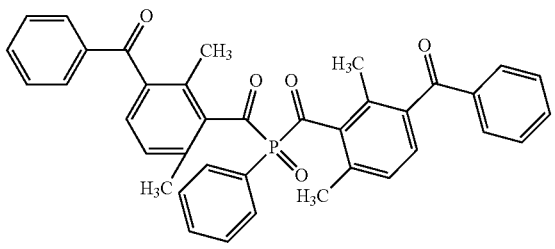

(3-benzoyl-2,6-dimethylphenyl)({[(3-benzoyl-2,6-dimethylphenyl)carbonyl](phenyl)phosphoryl})methanone

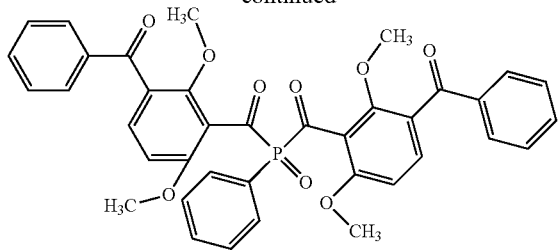

(3-benzoyl-2,6-dimethoxyphenyl)({[(3-benzoyl-2,6-dimethoxyphenyl)carbonyl](phenyl)phosphoryl})methanone

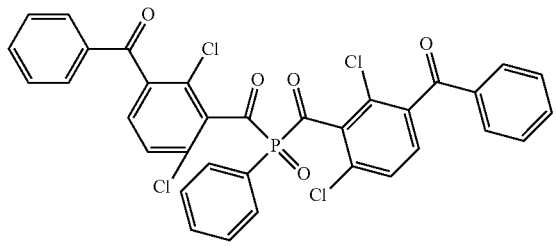

(3-benzoyl-2,6-dichlorophenyl)({[(3-benzoyl-2,6-dichlorophenyl)carbonyl](phenyl)phosphoryl})methanone

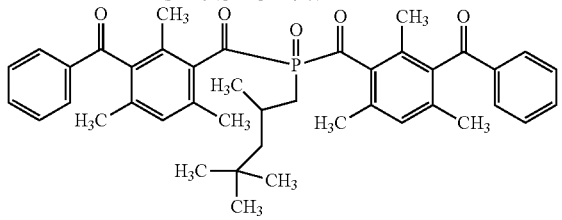

(3-benzoyl-2,4,6-trimethylphenyl)({[(3-benzoyl-2,4,6-trimethylphenyl)carbonyl](2,4,4-trimethylpentyl)phosphoryl})methanone

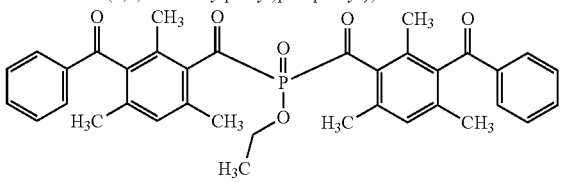

ethyl bis[(3-benzoyl-2,4,6-trimethylphenyl)carbonyl]phosphinate

Especially preferred photoactive oxides may be selected from:
(3-benzoyl-2,4,6-trimethylphenyl)(diphenylphosphoroso)methanone
Ethyl[(3-benzoyl-2,4,6-trimethylphenyl)carbonyl](phenyl)phosphinate
Methyl[(3-benzoyl-2,4,6-trimethylphenyl)carbonyl](phenyl)phosphinate
(3-benzoyl-2,4,6-trimethylphenyl)({[(3-benzoyl-2,4,6-trimethylphenyl)carbonyl](phenyl)phosphoryl})methanone.

Suitable photopolymerisable compounds may contain one or more olefinic double bonds. They can be of low molecular weight (monomeric) or relatively high molecular weight (oligomeric). Examples of monomers with a double bond are alkyl or hydroxyalkyl acrylates or methacrylates, for example methyl acrylate, ethyl acrylate, butyl acrylate, 2-ethylhexyl acrylate or 2-hydroxyethyl acrylate, isobornyl acrylate, methyl methacrylate or ethyl methacrylate. Also of interest are silicon- or fluorine-modified resins, e.g. silicone acrylates. Further examples are acrylonitrile, acrylamide, methacrylamide, N-substituted (meth)acrylamides, vinyl esters, such as vinyl acetate, vinyl ethers, such as isobutyl vinyl ether, styrene, alkyl- and halostyrenes, N-vinylpyrrolidone, vinyl chloride or vinylidene chloride. Examples of monomers having two or more double bonds are ethylene glycol diacrylate, propylene glycol diacrylate, neopentyl glycol diacrylate, hexamethylene glycol diacrylate or bisphenol A diacrylate, 4,4'-bis(2-acryloyloxyethoxy)diphenylpropane, trimethylolpropane triacrylate, pentaerythritol triacrylate or tetraacrylate, vinyl acrylate, divinylbenzene, divinyl succinate, diallyl phthalate, triallyl phosphate, triallyl isocyanurate or tris(2-acryloylethyl)isocyanurate. Examples of higher molecular weight (oligomeric) polyunsaturated compounds are acrylicized epoxy resins, polyurethanes, polyethers and polyesters which are acrylicized or contain vinyl ether or epoxy groups. Further examples of unsaturated oligomers are unsaturated polyester resins which are mostly prepared from maleic acid, phthalic acid and one or more diols and have molecular weights of from about 500 to 3,000. In addition, it is also possible to use vinyl ether monomers and oligomers, and maleate-terminated oligomers having polyester, polyurethane, polyether, polyvinyl ether and epoxy main chains. In particular, combinations of oligomers which carry vinyl ether groups and polymers as described in WO 90/01512 are highly suitable. However, copolymers of vinyl ether and maleic acid-functionalized monomers are also suitable. Such unsaturated oligomers may also be referred to as prepolymers.

Examples of particularly suitable compounds are esters of ethylenically unsaturated carboxylic acids and polyols or polyepoxides, and polymers containing ethylenically unsaturated groups in the chain or in side-groups, for example unsaturated polyesters, polyamides and polyurethanes and copolymers thereof, alkyd resins, polybutadiene and butadiene copolymers, polyisoprene and isoprene copolymers, polymers and copolymers containing (meth)acrylic groups in side chains, and mixtures of one or more such polymers.

Examples of unsaturated carboxylic acids are acrylic acid, methacrylic acid, crotonic acid, itaconic acid, cinnamic acid, unsaturated fatty acids such as linolenic acid or oleic acid. Preference is given to acrylic acid and methacrylic acid.

Preferred photopolymerisable compounds are monomeric and oligomeric acrylates described.

In the process, any suitable radiation source may be used. Advantageously, the radiation source may comprise one or more light emitting diodes (LEDs). Said radiation source preferably emits in the range 300 to 450 nm, more preferably, 350 to 400 nm.

The process may be used for a range of purposes. Advantageously, the process may comprise forming a coating by irradiation of said photopolymerisable compound. Such a coating may have a thickness in the range 0.2 micron to 500 microns, preferably in the range 2 to 100 microns.

The process may utilise a curing agent. A suitable curing agent may, for example, be an amine compound, for example an acrylated amine. Other examples include ethyl-4-(N,N-dimethylamino)benzoate (EDB), 2-n-butoxyethyl 4-(dimethylamino)benzoate (BEDB), triethanolamine, N-methyldiethanolamine and Michler's ketone.

The process may utilise a further photoinitiator in addition to said photoactive oxide. The further photoinitiator may be of the benzophene type.

The process may use a d-hydroxyacetophenone in combination with said photoactive oxide, for example to improve surface cure.

Photoactive oxides as described herein may be prepared by the process described herein and modifications thereof known to skilled persons or following and/or modifying methods described in US2001/0031898, WO2012/012067 and/or CA2022587.

According to a second aspect of the invention, there is provided a novel photoinitiator compound which is a phosphine oxide as described according to the first aspect per se.

Said photoactive oxide is preferably a liquid, for example, at 25° C. and atmospheric pressure.

Said phosphine oxide is preferably of formula

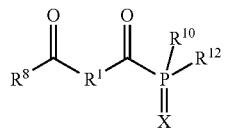

IX wherein X, $R^1$, $R^8$, $R^{10}$ and $R^{12}$ are as described herein; or it may be of formula

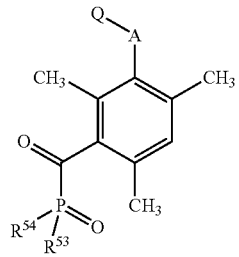

wherein Q, A, $R^{53}$ and $R^{54}$ are as described herein.
More preferably, said photoactive oxide is of formula

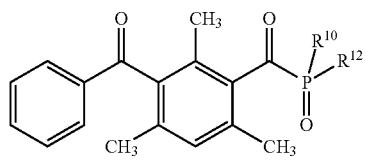

X wherein $R^{10}$ is phenyl, $R^{12}$ is selected from phenyl, alkoxy (especially methoxy or ethoxy) or a moiety of formula VIII wherein $R^2$, $R^3$ and $R^4$ are methyl, $R^5$ is hydrogen and $R^8$ is benzyl.

According to a third aspect, there is provided the use of a photoactive oxide, for example a phosphine oxide according to the first and/or second aspects in a polymerisation reaction.

According to a fourth aspect, there is provided a polymer curing composition, which may be in kit form, comprising a photoactive oxide, for example a phosphine oxide according to said first and/or second aspects, together with a curing agent with which the photoactive oxide may react, when irradiated, to generate a polymerisation specie, for example a radical.

According to a fifth aspect, there is provided a polymerisable composition comprising a polymerisable material suitably present in an amount from 80 to 99 wt % and a photoactive oxide, for example a phosphine oxide of the first and/or second aspects, suitably present in an amount from 20 to 1 wt. %.

The composition may further include a curing agent, suitably present in an amount from 14 to 2 wt %. Preferably, said polymerisation material is present in an amount from 80 to 97 wt % and said photoactive, for example phosphine oxide is present in an amount from 6 to 1 wt %. 5 wt % or less, preferably 4 wt % or less, more preferably 3 wt % or less of said photoactive, for example phosphine oxide may be present.

In accordance with a further aspect of the present invention, there is provided a polymeric composition prepared using a photoactive oxide, for example a phosphine oxide according to said first aspect or said polymerisable composition by photo-curing. The composition may include a curing agent. A suitable curing agent may, for example, be an amine compound, for example an acrylated amine. Other examples include ethyl-4-(N,N-dimethylamino)benzoate (EDB), 2-n-butoxyethyl 4-(dimethylamino)benzoate (BEDB), triethanolamine, N-methyldiethanolamine and Michler's ketone.

Any feature of any aspect of any invention described herein may be combined with any other invention described herein mutatis mutandis.

Figure 1:
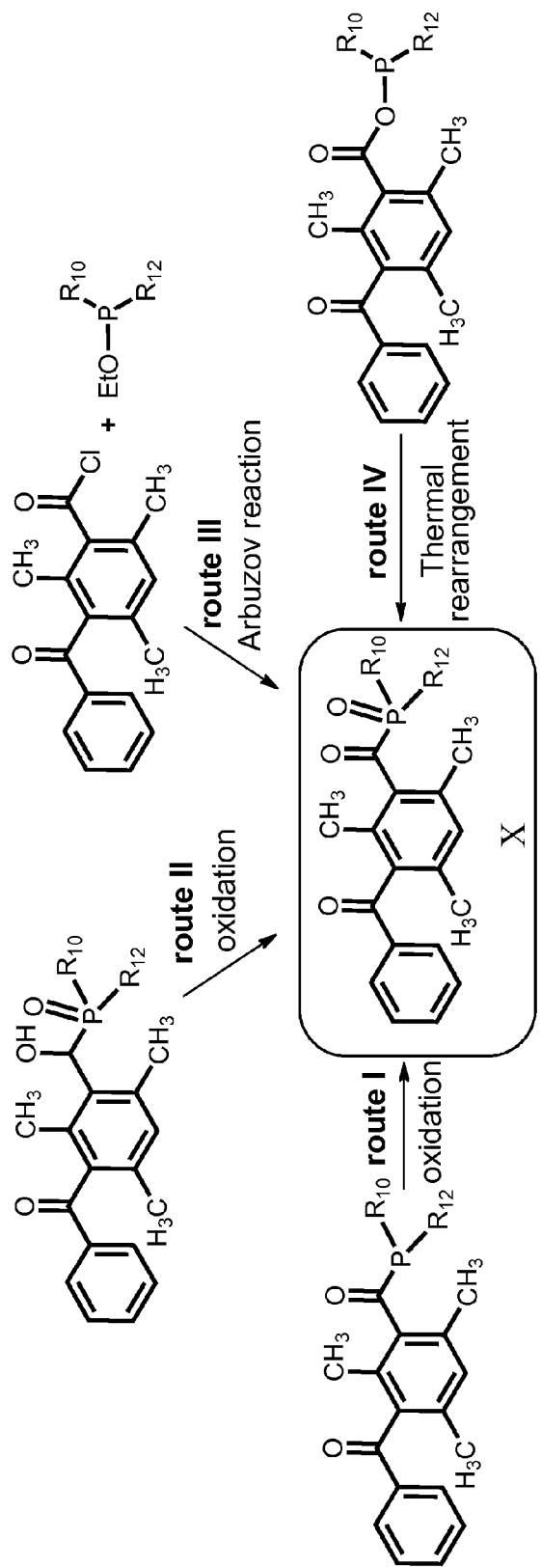
FIG. 1 shows a process for preparing a photoinitiator described herein.

Specific embodiments of the invention will now be described, by way of example, with reference to FIGS. 1 and 2 which include schemes detailing processes for preparing photoinitiators described herein. The following materials are referred to hereinafter.

Speedcure BP—a benzophenone photoinitiator.
Speedcure 7005—an oligomeric benzophenone photoinitiator.
Speedcure 7006—an oligomeric benzophenone photoinitiator.
Speedcure 7010—an oligomeric thixoanthone photoinitiator.
Speedcure ITX—isopropyl thioxanthione photoinitiator.
Speedcure (Trade Mark) materials are available from Lambson Limited.

EXAMPLE 1

Preparation of (3-benzoyl-2,4,6-trimethylbenzoyl)phenylphosphine oxide

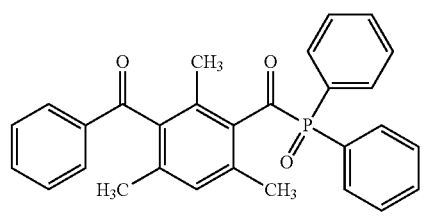 [SMILES: Cc1cc(C)c(C(=O)P(=O)(c2ccccc2)c2ccccc2)c(C)c1C(=O)c1ccccc1]

(i) Stage 1—Chloracetylation of 2,4,6-trimethylbenzophenone 2,4,6-trimethylbenzophenone (22.4 g; 0.10 g mol) was dissolved in carbon disulphide (25 ml). The temperature of this solution was maintained at 25-30° C. whilst aluminium chloride (20.0 g; 0.15 g mol) was added in portions.

Chloroacetyl chloride (11.3 g; 0.10 g mol) was then added over 15 minutes, with cooling to maintain the temperature at 20-25° C. Gas evolution occurred steadily throughout the addition. The mixture was then gradually warmed and the initial pale orange solution formed a mustard coloured slurry at 30° C. Heating was continued to reflux and after 30 minutes the mixture was cooled to 10° C.

Portions of concentrated hydrochloric acid and ice/water were then added alternately as follows: 15 ml acid, 20 ml water, 10 ml acid, 30 ml water, 5 ml acid, 30 ml water. The additions were highly exothermic and ice/water cooling was used to prevent boiling of the mixture. After agitating the resultant slurry for 30 minutes the mixture was filtered and the off-white cake washed with three portions of water. It was then air-dried.

Yield=27.0 g (89.9%)

TLC analysis in 1:1 acetone/petroleum ether showed one spot at rf 0.63

$^1$H-NMR (400 MHz, CDCl$_3$): 7.81 (d, J=8.2 Hz, 2H), 7.60 (tt, J=8.2, 1.4 Hz, 1H), 7.45 (t, J=8.7 Hz, 2H), 6.93 (s, 1H), 4.07 (s, 2H), 1.68 (s, 3H), 1.49 (s, 3H), 1.38 (s, 3H).

(ii) Stage 2—Conversion to 2,4,6-trimethylbenzophenone-3-carboxylic acid

Stage 1 product (15.0 g; 0.05 g mol) was slurried in 4.5% w/w sodium hydroxide solution (14.2 g; 0.016 g mol) and 3 drops of an alkyl alcohol ethoxylate surfactant were added to give a smooth slurry. This mixture was heated to 75° C. and 10% sodium hypochlorite solution (98.2 g; 0.13 g mol) was added over 2 hours. Following a 5-hour work-out at 75-80° C. the mixture was cooled to 40° C. and 50% w/w sodium hydroxide solution (26.0 g; 0.325 g mol) added over 15 minutes. The temperature was then raised to 95° C. for 5 hours, after which it was cooled back to 65° C. and acidified to pH2 with 98% sulphuric acid (15.6 g; 0.32 g mol). The resultant slurry was filtered at 60° C. and the collected solid suspended in water (80 ml) at 65° C. for 15 minutes. Re-filtration at 50° C. gave a cream coloured solid that was dried at 80° C.

Yield=10.8 g (77.7%)

Melting point=160-165° C.

$^1$H-NMR (400 MHz, CDCl$_3$): 10.77 (bs, 1H), 7.81 (d, J=8.3 Hz, 2H), 7.60 (t, J=7.4 Hz, 1H), 7.46 (t, J=7.8 Hz, 2H), 6.99 (s, 1H), 2.44 (s, 3H), 2.18 (s, 3H), 2.10 (s, 3H).

(iii) Stage 3—Preparation of Carboxylic Acid Chloride

Stage 2 product (4.0 g; 0.015 g mol) was dissolved in toluene (70 ml) and the solution azeotroped to remove a trace amount of water via a Dean and Stark arm. The dried solution was cooled back to 60° C. under nitrogen and thionyl chloride (2.5 g; 0.021 g mol) was added over 15 minutes. Following 2.5 hours at 60-65° C. TLC analysis in 1:1 acetone/petroleum ether showed that none of the carboxylic acid remained.

The solution was cooled to 40° C. and treated with activated carbon (1.0 g) for 1 hour. Following filtration the solvent and excess thionyl chloride were removed on a rotary evaporator by warming to 80° C. at about 20 mbar. This gave the product as an orange oil.

Yield=4.1 g (90.9%)

$^1$H-NMR (400 MHz, CDCl$_3$): 7.78 (d, J=7.7 Hz, 2H), 7.59 (tt, J=7.4, 1.3 Hz, 1H), 7.45 (t, J=7.8 Hz, 2H), 7.00 (s, 1H), 2.41 (s, 3H), 2.15 (s, 3H), 2.09 (s, 3H).

$^{13}$C-NMR (100 MHz, CDCl$_3$): 198.8, 170.2, 137.9, 137.3, 136.8, 136.4, 134.0, 133.2, 129.8, 129.2, 129.1, 128.9, 19.3, 19.2, 16.7.

(iv) Stage 4—Preparation of Acylphosphine Oxide

Stage 3 product (2.87 g; 0.0095 g mol) was dissolved in dry toluene (10 ml) and the solution warmed to 80° C. Ethoxydiphenylphosphine (2.3 g; 0.01 g mol) was then added over 10 minutes and the mixture stirred at 80° C. for 3 hours. Removal of solvent on a rotary evaporator up to 85° C. at 20 mbar gave the crude product as an orange oil.

Yield=5.3 g

TLC analysis of this oil in 3:2 hexane/ethyl acetate showed a major spot eluting at rf 0.28. Together with this there were also four smaller spots, two above and two below. 1.5 g of the crude product was subjected to column chromatography using the above mixed solvent as eluent. This successfully separated the major product from the minor components to initially give a viscous oil that set to a solid on standing.

Recovery=0.6 g (49.3% from the stage 3 acid chloride)

$^1$H-NMR (400 MHz, CDCl$_3$): 8.10-8.04 (m, 4H), 7.85 (d, J=8.8 Hz, 2H), 7.63-7.57 (m, 3H), 7.55-7.49 (m, 4H), 7.47 (t, J=8.8 Hz, 2H), 6.90 (s, 1H), 1.54 (s, 3H), 1.50 (s, 3H), 1.13 (s, 3H).

$^{31}$P-NMR (162 MHz, CDCl$_3$): 14.04 ppm (s).

UV(MeCN): $\lambda_{max}$=246 nm, 366 nm, 380 nm, 396 nm.

Overall yield from 2,4,6-trimethylbenzophenone was 31.3%.

EXAMPLE 2

Preparation of ethyl(3-benzoyl-2,4,6-trimethylbenzoyl)(phenyl)phosphinate

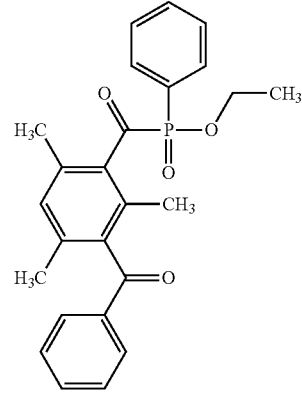 [SMILES: CCOP(=O)(C(=O)c1c(C)cc(C)c(C(=O)c2ccccc2)c1C)c1ccccc1]

Steps (i) to (iii) of Example 1 were repeated. Then the acid chloride of step (ii) was reacted with diethyl phenylphosphonite PhP(OCH$_2$CH$_3$)$_2$. The reaction was carried out on a 0.0217 mole scale in a 100 ml conical flask held at 45°-55° C. in an oil bath. The flask was charged with 23.9 g acid chloride (86.3% active, 0.072 moles) and 165 ml hexane. Diethyl phenylphosphonite (17.6 g, 0.089 moles) was fed over 30 minutes, then the reaction was held at 45°-55° C. for 4 Hrs. TLC was used to monitor the reaction. As the reaction proceeded, the product separated out as an orange oil, and after 4 hours, 100 ml ethyl acetate was added which gave an homogeneous reaction. The reaction was held for a further 2 hours at 55° C., and TLC was used to check for completion. The resulting solution was stripped under partial then full vacuum to give 38.2 g oil. This was dissolved in 165 ml ethyl acetate, and washed with 80 ml water containing 16.5 g of 2% sodium carbonate solution. The layers were separated, then the ethyl acetate layer was washed with 100 ml water, dried over sodium sulphate and stripped under partial then full vacuum to give 29.5 g viscous orange oil (97.7% theory).

The product was tested by HPLC at 96.9 area %.

$^1$H-NMR (400 MHz, CDCl$_3$): 7.83-7.77 (m, 2H), 7.72 (m, 2H), 7.60-7.54 (m, 2H), 7.49-7.44 (m, 2H), 7.44-7.40 (m, 2H), 6.92 (s, 1H), 4.18 (m, 2H), 2.22 (s, 3H), 2.06 (s, 3H), 1.86 (s, 3H), 1.33 (t, J=7.1 Hz, 3H).

$^{31}$P-NMR (162 MHz, CDCl$_3$): 18.04 ppm (s).

UV(MeCN): $\lambda_{max}$=247 nm ($E_{10\%}^{1\%}$=504), 363 nm.

EXAMPLE 3

Preparation of Methyl(3-benzoyl-2,4,6-trimethylbenzoyl)(phenyl)phosphinate

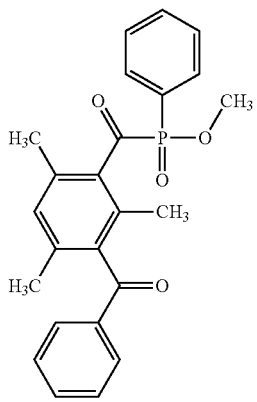 [SMILES: COP(=O)(C(=O)c1c(C)cc(C)c(C(=O)c2ccccc2)c1C)c1ccccc1]

The reaction was carried out on a 0.025 mole scale in a 100 ml conical flask held in an oil bath. The flask was charged with 8.3 g acid chloride (86.3 active, 0.025 moles) and 40 mls hexane. There were taken to 45°-50° C. Dimethyl phenylphosphonite (4.3 g, 0.025 moles) was fed over 30 mins, the dropping funnel used was washed with 20 mls hexane. The reaction was held at 45°-50° C. for 3.5 Hrs, then at 55°-60° C. for 4.5 Hrs. A pale orange it separated from the solvent as the reaction proceeded. Ethyl acetate (30 mls) was added to give an homogenous solution, and the reaction was held at 55°-60° C. for 2 Hrs. TLC was used to monitor the reaction. This showed a small amount of unreacted acid chloride remained, so a further 0.7 g Dimethyl phenylphosphonite (0.004 moles) were added, and the reaction held for a further 5 Hrs at 65° C. The solution was stripped on a rotary evaporator under partial vacuum, then at 10 mm Hg. The product was redissolved in 60 mls ethyl acetate, and washed with 120 g of 1% sodium carbonate solutin. The solvent was removed by rotary evaporatin as above. Finally the product was dissolved in 60 mls DCM, and washed with 25 g of 2% NaOH solution, then 25 mls water. The layers were separated, the DCM layer was dried over sodium sulphate and stripped under partial then full vacuum to give 7.1 g viscous orange oil (70% theory).

$^1$H-NMR (400 MHz, CDCl$_3$): 7.82-7.76 (m, 2H), 7.73-7.69 (m, 2H), 7.61-7.53 (m, 2H), 7.49-7.44 (m, 2H), 7.44-7.39 (m, 2H), 6.92 (s, 1H), 3.81 (d, $J_{C-P}$=10.7 Hz, 3H), 2.21 (s, 3H), 2.05 (s, 3H), 1.85 (s, 3H).

UV(MeCN): $\lambda_{max}$=247 nm ($E_{10\%}^{1\%}$=497), 362 nm.

Testing of Compounds

EXAMPLE 4

Curing was carried out using a Dymax UVC-5 Curing System. This incorporates a conveyor belt, which was set at 16.5 m/min. Two UV sources were used:
(a) 900 W High Pressure Hg Lamp (this is part of the Dymax UVC-5 Curing system).
(b) An LED light source, replacing the Hg lamp. The LED source used was a Phoseon Firefly, emitting a peak power output of 2 W/cm$^2$ at 395 nm.

The resin mixture consisted of a mixture of:
60 wt % Sartomer SR348L (Ethoxylated-2EO-Bisphenol A Dimethacrylate)
25 wt % Sartomer SR306 (Tripropylene glycol dimethacrylate)
15 wt % Sartomer CN3715 (Acrylated amine synergist)

The resin mixture was mixed at ca 40°-50° C. with one or more photoinitiators. The levels of photoinitiator are quoted as parts per 100 parts of resin mix by weight.

The test substrate (i.e. resin mixture and photoinitiator(s)) was applied to waxed paper at 4 μm, 12 μm, 24 μm, and 100 μm thickness using K-Bars to give a smooth film for testing. These were then placed on the conveyor and passed under the UV source. The hardening and eventual full curing of the films were measured by applying a thumb twist procedure—the fully cured films do not leave any observable mark from placing a thumb on the film and twisting. The results quoted are number of passes under each UV source to give a fully cured film. By inference, the lower the number of passes, the more active the photoinitiator in the sample under test.

Comparisons were made with other commercial SPEEDCURE (Trade Mark) photoinitiators, available from Lambson Ltd, and Irgacure 819 (BAPO) available from BASF. Results are provided for the two UV sources used.

Results as provided in Tables 1 and 2 and are discussed below.

(i) Table 1 details results obtained using a Hg lamp. Equimolar amount of phosphine oxide and other additives were used in each test to give comparable results. The results are expressed in terms of the number of passes required to achieve full cure.

TABLE 1

| Phosphine oxide (wt %) | Speedcure BP or 7005 or 7006 | Speedcure 7010 or ITX | 4 micron | 12 micron | 24 micron | 100 micron |
|---|---|---|---|---|---|---|
| 2.9% TPO | None | None | | | 22 | 24 |
| 2.6% TPO-L | None | None | | | 16 | 15 |
| 3.5% BAPO | None | None | | | 9 | 7 |
| 3.5% Example 2 | None | None | | | 5 | 4 |
| 3.4% Example 3 | None | None | | | 4 | 5 |
| 2.6% TPO-L | 1.0% BP | None | 11 | 4 | 3 | 3 |
| 3.5% BAPO | 1.0% BP | None | 7 | 3 | 3 | 2 |
| 3.5% | 1.0% BP | None | 6 | 2 | 2 | 2 |

TABLE 1-continued

| Phosphine oxide (wt %) | Speedcure BP or 7005 or 7006 | Speedcure 7010 or ITX | 4 micron | 12 micron | 24 micron | 100 micron |
|---|---|---|---|---|---|---|
| Example 2 3.4% | 1.0% BP | None | 6 | 3 | 2 | 2 |
| Example 3 2.6% TPO-L | 2.4% 7005 | None | 12 | 8 | 6 | 5 |
| 3.5% BAPO | 2.4% 7005 | None | 9 | 4 | 4 | 3 |
| 3.5% Example 2 3.4% | 2.4% 7005 | None | 6 | 3 | 3 | 3 |
| Example 3 2.6% TPO-L | 2.4% 7005 | None | 7 | 4 | 3 | 3 |
| 3.5% BAPO | 1.0% 7006 | None | 12 | 5 | 5 | 4 |
| 3.5% Example 2 3.4% | 1.0% 7006 | None | 8 | 4 | 4 | 3 |
| Example 3 2.6% TPO-L | 1.0% 7006 | None | 6 | 3 | 3 | 3 |
| 3.5% BAPO | 1.0% 7006 | None | 6 | 3 | 3 | 3 |
| 3.5% Example 2 3.4% | None | 1.0% 7010 | 11 | 7 | 5 | 5 |
| Example 3 2.6% TPO-L | None | 1.0% 7010 | 8 | 5 | 3 | 3 |
| 3.5% BAPO | None | 1.0% 7010 | 7 | 3 | 3 | 3 |
| 3.5% Example 2 3.4% | None | 1.0% 7010 | 6 | 3 | 3 | 3 |
| Example 3 2.6% TPO-L | None | 1.2% ITX | 4 | 2 | 2 | 2 |
| 3.5% BAPO | None | 1.2% ITX | 2 | 1 | 1 | 1 |
| 3.5% Example 2 3.4% | None | 1.2% ITX | 3 | 2 | 2 | 2 |
| Example 3 | None | 1.2% ITX | 3 | 2 | 2 | 2 |

Table 2 details results obtained using LED Firefly. The curing mixture comprised of 8.5 g standard acrylate mix (as described above) and 1.5 g CN3715 acrylated amine. Equimolar amounts of phosphine oxide and benzophenone components were used in each test to give comparable results. The results refer to the number of passes to achieve full cure.

TABLE 2

| Phosphine oxide (wt %) | Speedcure BP (TMBP) | Speedcure ITX | 24 micron | 100 micron |
|---|---|---|---|---|
| 2.9% TPO | None | 0.4% | Not surface cured (40 passes) | Not surface cured (40 passes) |
| 2.6% TPO-L | None | 0.4% | Not surface cured (40 passes) | 30 |
| 3.5% BAPO | None | 0.4% | 22 | 18 |
| 3.75% Example 1 | None | 0.4% | 30 | 25 |
| 3.5% Example 2 | None | 0.4% | 30 | 22 |
| 2.9% TPO | None | 0.8% | 25 | 20 |
| 2.6% TPO-L | None | 0.8% | 17 | 16 |
| 2.6% TPO-L | 1.9 (TMBP) | 0.8% | 17 | 16 |
| 3.5% Example 2 | None | 0.8% | 14 | 14/15 |
| 2.9% TPO | None | 1.2% | 14 | 11 |
| 2.9% TPO | 1.0 (BP) | 1.2% | 14 | 11 |
| 2.6% TPO-L | None | 1.2% | 9 | 8 |
| 2.6% TPO-L | 1.9 (TMBP) | 1.2% | 9 | 9 |
| 3.5% BAPO | None | 1.2% | 7 | 7 |
| 3.75% Example 1 | None | 1.2% | 8 | 7 |
| 3.5% Example 2 | None | 1.2% | 8 | 7 |

EXAMPLE 5

Following the procedures described in Example 4, further testing was undertaken and the results are provided in Table 3.

TABLE 3

| Phosphine oxide | wt % in form[a] | Other Photo-initiators | Light source | Film (μm) | Curing performance |
|---|---|---|---|---|---|
| Example 1 | 3.75[a] | None | LED | 24 | Not surface-cured after 40 passes |
| Example 1 | 3.75[a] | None | Hg | 24 | 5 passes for full cure |
| Example 1 | 3.75[a] | 0.4% ITX | LED | 24 | 30 passes for full cure |
| Example 1 | 3.75[a] | 1.2% ITX | LED | 24 | 8 passes for full cure |
| TPO | 2.9 | None | LED | 24 | Not surface-cured after 40 passes |
| TPO | 2.9 | | Hg | 24 | 22 passes for full cure |
| TPO | 2.9 | 0.4% ITX | LED | 24 | Not surface-cured after 40 passes |
| TPO | 2.9 | 0.4% ITX + 1.0% BP | LED | 24 | Not surface-cured after 40 passes |
| TPO | 2.9 | 1.2% ITX | LED | 24 | 14 passes for full cure |
| TPO | 2.9 | 2.0% ITX | LED | 24 | 7 passes for full cure |
| TPO | 2.9 | 4.0% ITX | LED | 24 | 4 passes for full cure |
| | 2.9 | | Hg | 24 | 1 pass for full cure |
| TPO | 2.9 | 1.2% ITX + 1.0% BP | LED | 24 | 14 passes for full cure |
| | | | | 100 | 11 passes for full cure |

[a]Same molar amount as 2.9% TPO.

Discussion

It is clear from the results that compounds in accordance with preferred embodiments of the invention are advantageous over the comparative examples which is particularly relevant when an LED light source is used. In addition, compared to commercially available BAPO, compounds in accordance with preferred embodiments may be advantageous due to the increased solubility. In this regard, BAPO has a solubility of 9% w/w in hexadiol diacrylate (HDDA), whereas compounds in accordance with preferred embodiments are liquid and are fully soluble with HDDA.

Photoinitiators according to preferred embodiments of the invention may, for example, be synthesized via the synthetic routes described in the scheme in FIG. 1.

Referring to FIG. 1, Route I is an oxidation of a trivalent phosphorus atom of a monoacylphosphine to a monoacylphosphine oxide. Such oxidations may be carried our using hydrogen peroxide, or peroxyacids such as peroxyacetic or m-chloroperoxybenzoic acid. The Synthesis of monoacylphosphines is described, for example, in EP0040721.

Route II is an oxidation of a α-hydroxybenzylphosphine oxide to a benzoylphosphine oxide. Such oxidations may be carried out using tert-butyl hydroperoxide in the presence of a transition metal catalyst such as vanadyl acetylacetonate. Suitable reaction conditions are given, for example, in U.S. Pat. No. 5,679,863 or U.S. Pat. No. 5,504,236.

Route III is an Arbuzov reaction of a benzoyl chloride with a trivalent phosphorus reagent bearing an ethoxy group, which provides the desired acylphosphine oxide X and ethylchloride byproduct. Suitable reaction conditions are given, for example, in U.S. Pat. No. 4,298,738.

Route IV is a thermal rearrangement of a benzoyloxyphosphine to a benzoylphosphine oxide. Such thermal rearrangement proceeds in the absence of a catalyst above 100° C., or above 80° C. in the presence of a Lewis acid catalyst such as Friedel-Crafts catalyst. Suitable reaction conditions are described, for example, in U.S. Pat. No. 7,368,604.

Figure 2:
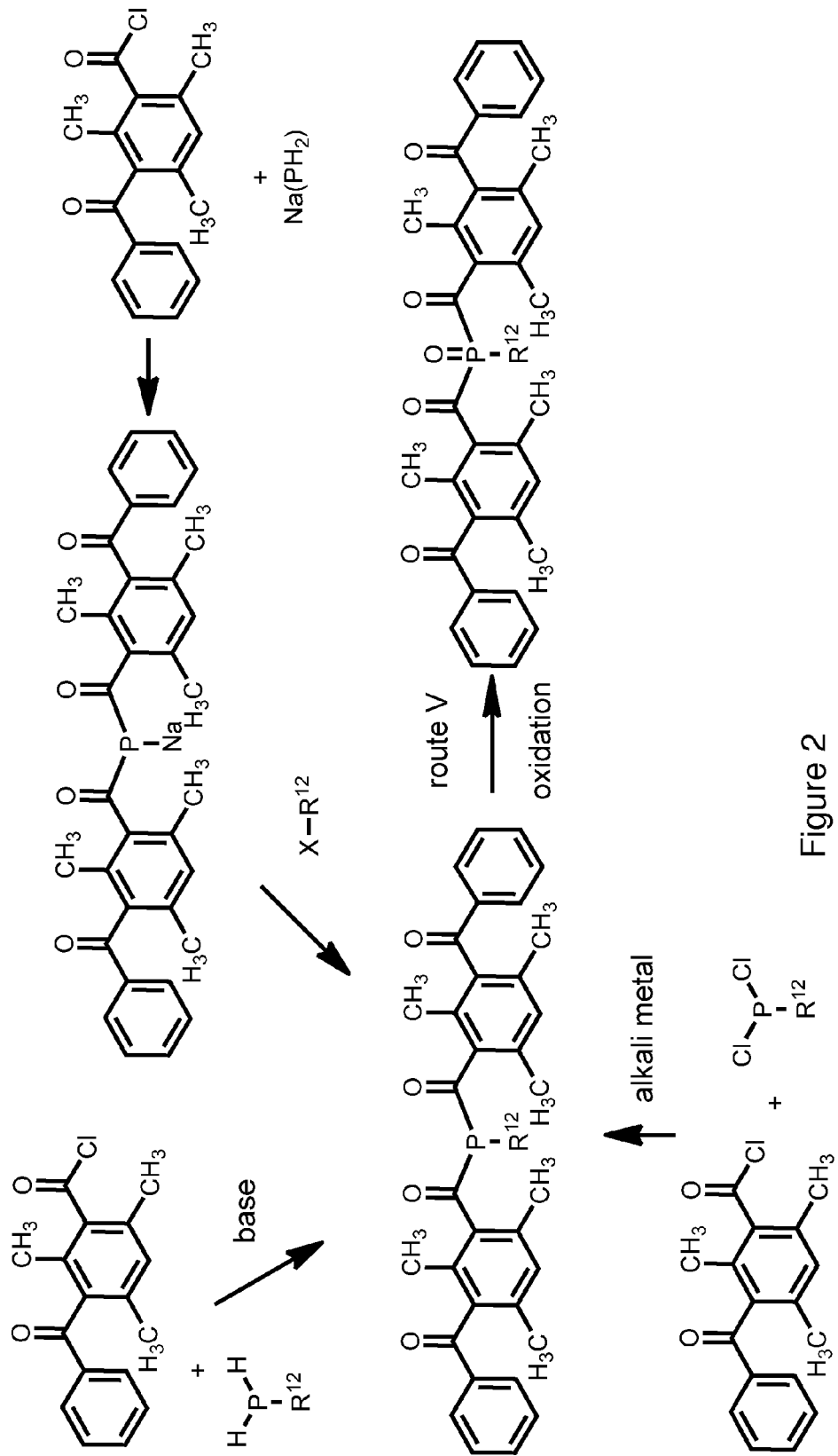
FIG. 2 shows a process for preparing a photoinitiator described herein.

Photoinitiators of the bis acyl phosphine type described in preferred embodiments of the present invention may, for example, be synthesized via the synthetic routes described in FIG. 2.

Route V is an oxidation of a trivalent phosphorus atom of a bisacylphosphine to a bisacylphosphine oxide. Such oxidations may be carried our using hydrogen peroxide, or peroxyacids such as peroxyacetic or m-chloroperoxybenzoic acid. The Synthesis of bisacylphosphines is described, for example, in EP0040721. Suitable bisacylphosphines are available, for example, by reacting a suitable benzoyl chloride with a primary phosphine $R^{12}$—$PH_2$ in the presence of a base such as triethyl amine (for conditions, see EP 0495751). Alternatively, bisacylphosphines may be prepared by reacting a suitable benzoyl chloride with a dimetallated primary phosphine $R^{12}$—$PM_2$, where M is an alkali metal such as lithium or sodium. Such metallised phosphines may be formed in situ by from the appropriate dichlorophosphine $R^{12}$—$PCl_2$ and an alkali metal. Such reactions are described, for example, in EP1135399, EP1648908 or EP 1651655. Thirdly, suitable bisacylphosphines may be prepared by alkylation or arylation of a metallated bisacylphosphine, which is produced by reacting an appropriate benzoylchloride with a sodium dihydrogenphosphide reagent. Such reactions are described, for example, in Angew. Chem. Int. Ed., Vol 51, Issue 32, p. 7895-7897 or C J H Hendriksen, E T H Zurich, Dissertation ETH No. 20148, 2012.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A process for photopolymerising a photopolymerisable compound having at least one ethylenically unsaturated double bond, which comprises contacting said photopolymerisable compound with a photoactive oxide and irradiating it, wherein the photoactive oxide includes a moiety of the following formula

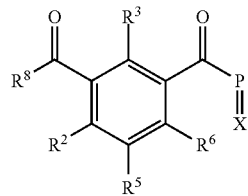

wherein X represents an oxygen or sulphur atom;
where $R^2$, $R^3$ and $R^4$ independently represent $C_{1-20}$ alkyl and $R^5$ represents a hydrogen atom; and
$R^8$ is an optionally-substituted phenyl group.

2. A process according to claim 1, wherein X represents an oxygen atom.

3. A process according to claim 1, wherein $R^8$ is a phenyl moiety optionally-substituted by $C_{1-C18}$alkyl, $C_2$-$C_6$alkenyl, phenylvinyl, $C_1$-$C_8$alkyl which is mono- or poly-substituted by phenyl, $C_2$-$C_5$alkoxycarbonyl, halogen, $C_1$-$C_{12}$alkoxy, phenoxy, $C_1$-$C_{12}$alkylthio or phenylthio, $C_5$-$C_{10}$cycloalkyl which is unsubstituted or substituted by $C_1$-$C_{12}$alkyl, phenyl, phenoxy, $C_1$-$C_{12}$alkoxy, $C_2$-$C_5$alkoxycarbonyl, $C_1$-$C_4$alkylthio or halogen, $C_6$-$C_{12}$aryl which is unsubstituted or mono- or poly-substituted by $C_1$-$C_{12}$alkyl, $C_1$-$C_{12}$alkoxy, $C_1$-$C_{12}$alkoxyalkyl, $C_1$-$C_4$ alkylthio or halogen, or a monovalent 5-membered or 6-membered heterocyclic radical containing one or more O, S or N atoms, which radical can be mono- or poly-substituted by halogen, $C_1$-$C_4$alkyl or $C_1$-$C_4$alkoxy.

4. A process according to claim 1, wherein said photoactive oxide includes a moiety of the following formula

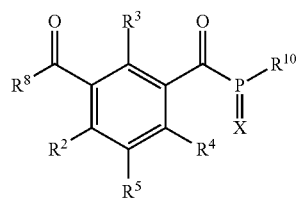

wherein $R^{10}$ is optionally-substituted phenyl.

5. A process according to claim 1, wherein said photoactive oxide includes a moiety of the following formula

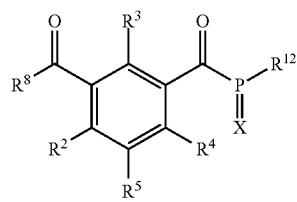

wherein $R^{12}$ is optionally-substituted benzyl, $C_{1-20}$ alkyl carbonyl, $C_1$-$C_{18}$alkyl, $C_2$-$C_{18}$alkenyl, $C_1$-$C_8$alkyl which is monosubstituted or polysubstituted by phenyl, ($C_1$-$C_{12}$alkyl)-phenyl, halogenophenyl, ($C_1$-$C_{12}$alkoxy)-phenyl, cyano, $C_2$-$C_5$alkoxycarbonyl, $C_1$-$C_{12}$alkoxy or halogen, $C_5$-$C_8$cycloalkyl, $C_6$-$C_{12}$aryl which is unsubstituted or mono- or poly-substituted by halogen, $C_1$-$C_{12}$alkyl or $C_1$-$C_{12}$alkoxy, a 5-membered or 6-membered heterocyclic monovalent radical which contains one or more O, S or N atoms and which may contain a fused benzo radical or is unsubstituted or substituted by $C_1$-$C_4$alkyl, $C_1$-$C_4$alkoxy or halogen.

6. A process according to claim 1, wherein said photoactive oxide is of the following formula

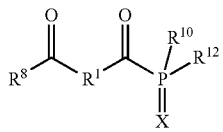

IX wherein:

$R^1$ is a benzene moiety;

$R^8$ is a phenyl moiety optionally-substituted by $C_1$-$C_{18}$alkyl, $C_2$-$C_6$ alkenyl, phenylvinyl, $C_1$-$C_8$alkyl which is mono- or poly-substituted by phenyl, $C_2$-$C_5$alkoxycarbonyl, halogen, $C_1$-$C_{12}$ alkoxy, phenoxy, $C_1$-$C_{12}$alkylthio or phenylthio, $C_5$-$C_{10}$ cycloalkyl which is unsubstituted or substituted by $C_1$-$C_{12}$ alkyl, phenyl, phenoxy, $C_1$-$C_{12}$alkoxy, $C_2$-$C_5$alkoxycarbonyl, $C_1$-$C_4$alkylthio or halogen, $C_6$-$C_{12}$ aryl which is unsubstituted or mono- or poly-substituted by $C_1$-$C_{12}$ alkyl, $C_1$-$C_{12}$alkoxy, $C_1$-$C_{12}$alkoxyalkyl, $C_1$-$C_4$alkylthio or halogen, or a monovalent 5-membered or 6-membered heterocyclic radical containing one or more O, S or N atoms, which radical can be mono- or poly-substituted by halogen, $C_1$-$C_4$alkyl or $C_1$-$C_4$alkoxy;

$R^{10}$ is optionally-substituted phenyl;

$R^{12}$ is optionally-substituted benzyl, $C_{1-20}$ alkyl carbonyl, $C_1$-$C_{18}$alkyl, $C_2$-$C_{18}$alkenyl, $C_1$-$C_8$alkyl which is monosubstituted or polysubstituted by phenyl, ($C_1$-$C_{12}$alkyl)-phenyl, halogenophenyl, ($C_1$-$C_{12}$alkoxy)-phenyl, cyano, $C_2$-$C_5$alkoxycarbonyl, $C_1$-$C_{12}$alkoxy or halogen, $C_5$-$C_8$cycloalkyl, $C_6$-$C_{12}$aryl which is unsubstituted or mono- or poly-substituted by halogen, $C_r$-$C_{12}$alkyl or $C_1$-$C_{12}$alkoxy, a 5-membered or 6-membered heterocyclic monovalent radical which contains one or more O, S or N atoms and which may contain a fused benzo radical or is unsubstituted or substituted by $C_1$-$C_4$alkyl, $C_1$-$C_4$alkoxy or halogen; and X represents an oxygen atom; or said photoactive oxide is of the following formula

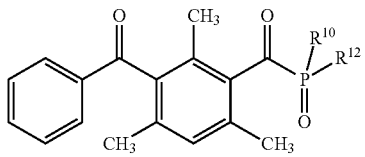

X wherein $R^{10}$ is phenyl, $R^{12}$ is selected from phenyl, alkoxy or a moiety of formula

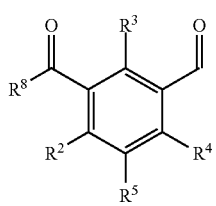

VIII which is linked by the carbonyl at the right hand side of VIII to the P=X moiety and wherein $R^2$, $R^3$ and $R^4$ are methyl, $R^5$ is hydrogen and $R^8$ is benzyl; or said photoactive oxide is of the following formula

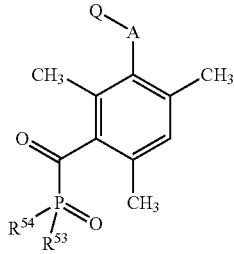

wherein moiety A is a direct link or represents C=O, $(CH_2)n$ wherein n is 1 to 30 $CH_2C$=O, $CH_2O$, $OCH_2$, and Q represents optionally-substituted phenyl when A represents C=O; when A represents a direct link or one of the other linking groups (except C=O), Q suitably represents $R^{50}COR^{51}$— or a thioxanthyl group, wherein $R^{50}$ and $R^{51}$ represent optionally-substituted aryl moieties; and $R^{53}$ and $R^{54}$ independently represent unsubstituted phenyl groups or optionally-substituted phenyl groups.

7. A process according to claim 1, wherein said photopolymerisable compound is a monomeric or oligomeric acrylate.

8. A process for photopolymerising a photopolymerisable compound having at least one ethylenically unsaturated double bond, which comprises contacting said photopolymerisable compound with a photoactive oxide and irradiating it, wherein the photoactive oxide includes a moiety of the following formula

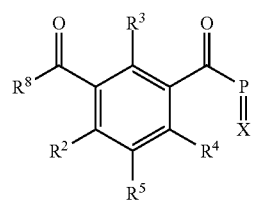

V wherein X represents an oxygen or sulphur atom;

$R^2$, $R^3$, $R^4$ and $R^5$ independently represent hydrogen, halogen, $C_{1-20}$alkyl, $OR_6$, $CF_3$ or two of radicals $R^2$, $R^3$, $R^4$ and $R^5$ to ether form $C_{1-20}$ alkylene which can be interrupted by O, S or $NR^7$, wherein $R^6$ is hydrogen, $C_{1-20}$ alkyl, $C_{2-20}$ alkenyl, $C_3$-$C_8$ cycloalkyl, phenyl, benzyl or $C_{2-20}$ alkyl which is interrupted once or more than once by O or S and which is unsubstituted or is substituted by OH and/or SH, wherein $R^7$ is hydrogen, phenyl, $C_{1-12}$ alkyl or $C_{2-12}$ alkyl which is interrupted once or more than once by O or S and which is unsubstituted or substituted by OH and/or SH; and $R^8$ is an optionally-substituted phenyl group, wherein the process comprises forming a coating by irradiation of said photopolymerisable compound, said coating having a thickness in the range 0.2 micron to 500 microns.

9. A process according to claim 1 which utilises a curing agent which is an amine compound.

10. A process according to claim 1, the process utilising a further photoinitiator in addition to said photoactive oxide.

11. A process for photopolymerising a photopolymerisable compound having at least one ethylenically unsaturated double bond, which comprises contacting said photopolymerisable compound with a photoactive oxide and irradiating it, wherein the photoactive oxide includes a moiety of the following formula

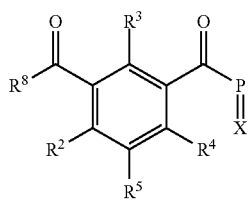

V wherein X represents an oxygen or sulphur atom;
$R^2$, $R^3$, $R^4$ and $R^5$ independently represent hydrogen, halogen, $C_{1-20}$alkyl, $OR_6$, $CF_3$ or two of radicals $R^2$, $R^3$, $R^4$ and $R^5$ together form $C_{1-20}$ alkylene which can be interrupted by O, S or $NR^7$, wherein $R^6$ is hydrogen, $C_{1-20}$ alkyl, $C_{2-20}$ alkenyl, $C_3$-$C_8$ cycloalkyl, phenyl, benzyl or $C_{2-20}$ alkyl which is interrupted once or more than once by O or S and which is unsubstituted or is substituted by OH and/or SH, wherein $R^7$ is hydrogen, phenyl, $C_{1-12}$ alkyl or $C_{2-12}$ alkyl which is interrupted once or more than once by O or S and which is unsubstituted or substituted by OH and/or SH; and
$R^8$ is an optionally-substituted phenyl group, wherein the process uses a α-hydroxyacetophenone in combination with said photoactive oxide.

12. A polymer curing composition, in kit form, comprising a phosphine oxide according claim 1, together with a curing agent with which the photoactive oxide reacts when irradiated, to generate a polymerisation specie.

13. A polymerisable composition comprising a polymerisable material and a photoactive oxide according to claim 1.

14. A process for photopolymerising a photopolymerisable compound having at least one ethylenically unsaturated double bond, which comprises contacting said photopolymerisable compound with a photoactive oxide and irradiating it, wherein the photoactive oxide includes a moiety of the following formula

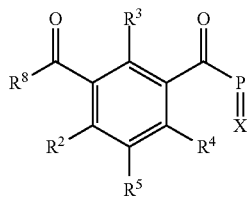

V wherein X represents an oxygen or sulphur atom;
$R^2$, $R^3$, $R^4$ and $R^5$ independently represent hydrogen, halogen, $C_{1-20}$ alkyl, $OR_6$, $CF_3$ or two of radicals $R^2$, $R^3$, $R^4$ and $R^5$ together form $C_{1-20}$ alkylene which can be interrupted by O, S or $NR^7$, wherein $R^6$ is hydrogen, $C_{1-20}$ alkyl, $C_{2-20}$ alkenyl, $C_3$-$C_8$ cycloalkyl, phenyl, benzyl or $C_{2-20}$ alkyl which is interrupted once or more than once by O or S and which is unsubstituted or is substituted by OH and/or SH, wherein $R^7$ is hydrogen, phenyl, $C_{1-12}$ alkyl or $C_{2-12}$ alkyl which is interrupted once or more than once by O or S and which is unsubstituted or substituted by OH and/or SH; and
$R^8$ is an optional substituted phenyl group.

15. A process according to claim 1, wherein said photoactive oxide is selected from

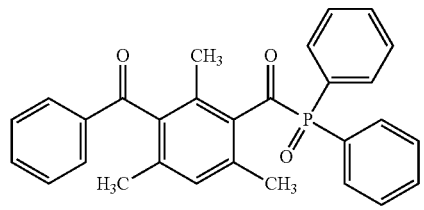

(3-benzoyl-2,4,6-trimethylphenyl)(diphenylphosphoroso)methanone

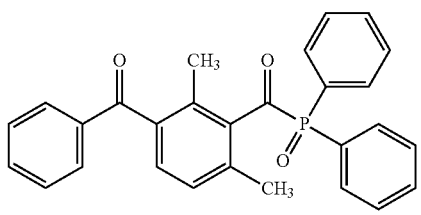

(3-benzoyl-2,6-dimethylphenyl)(diphenylphosphoroso)methanone

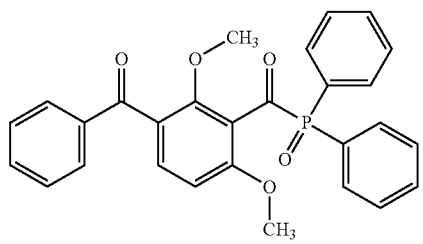

(3-benzoyl-2,6-dimethoxyphenyl)(diphenylphosphoroso)methanone

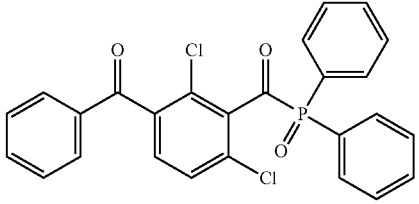

(3-benzoyl-2,6-dichlorophenyl)(diphenylphosphoroso)methanone

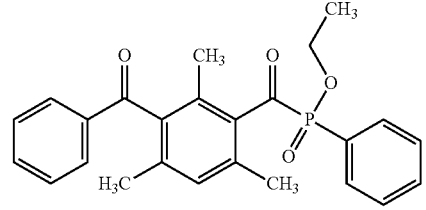

ethyl [(3-benzoyl-2,4,6-trimethylphenyl) carbonyl](phenyl)phosphinate

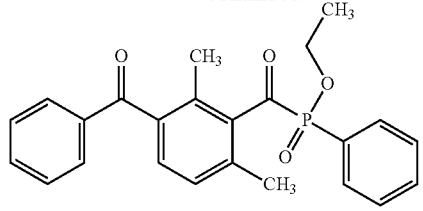
ethyl [(3-benzoyl-2,6-dimethylphenyl)
carbonyl](phenyl)phosphinate

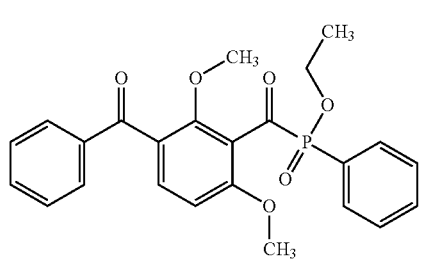
ethyl [(3-benzoyl-2,6-dimethoxyphenyl)
carbonyl](phenyl)phosphinate

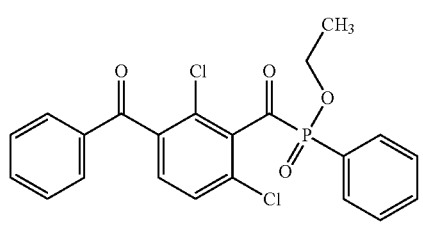
ethyl [(3-benzoyl-2,6-dichlorophenyl)
carbonyl](phenyl)phosphinate

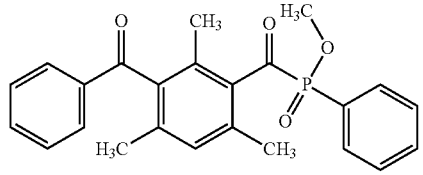
methyl [(3-benzoyl-2,4,6-trimethylphenyl)
carbonyl](phenyl)phosphinate

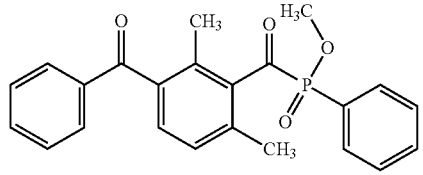
methyl [(3-benzoyl-2,6-dimethylphenyl)
carbonyl](phenyl)phosphinate

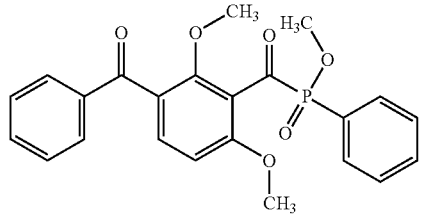
methyl [(3-benzoyl-2,6-dimethoxyphenyl)
carbonyl](phenyl)phosphinate

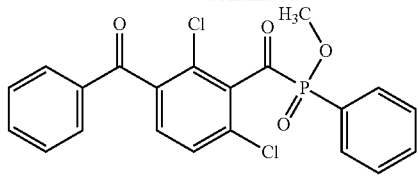
methyl [(3-benzoyl-2,6-dichlorophenyl)
carbonyl](phenyl)phosphinate

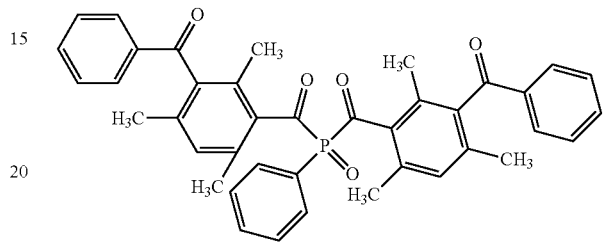
(3-benzoyl-2,4,6-trimethylphenyl)({[(3-
benzoyl-2,4,6-trimethylphenyl)carbonyl]
(phenyl)phosphoryl})methanone

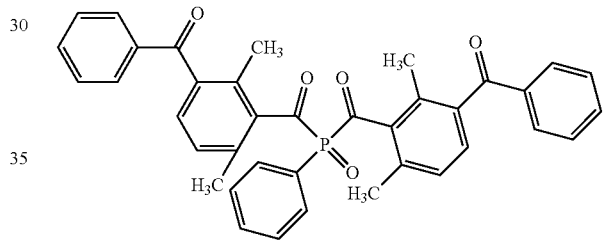
(3-benzoyl-2,6-dimethylphenyl)({[(3-
benzoyl-2,6-dimethylphenyl)carbonyl]
(phenyl)phosphoryl})methanone

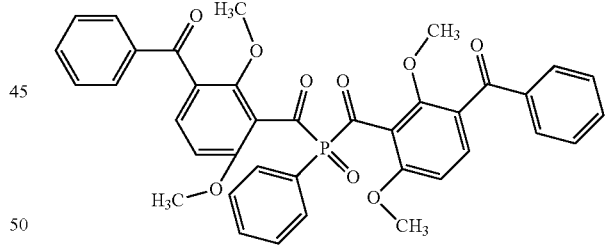
(3-benzoyl-2,6-dimethoxyphenyl)({[(3-
benzoyl-2,6-dimethoxyphenyl)carbonyl]
(phenyl)phosphoryl})methanone

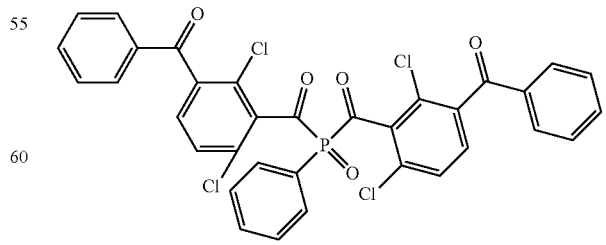
(3-benzoyl-2,6-dichlorophenyl)({[(3-
benzoyl-2,6-dichlorophenyl)carbonyl]
(phenyl)phosphoryl})methanone -continued

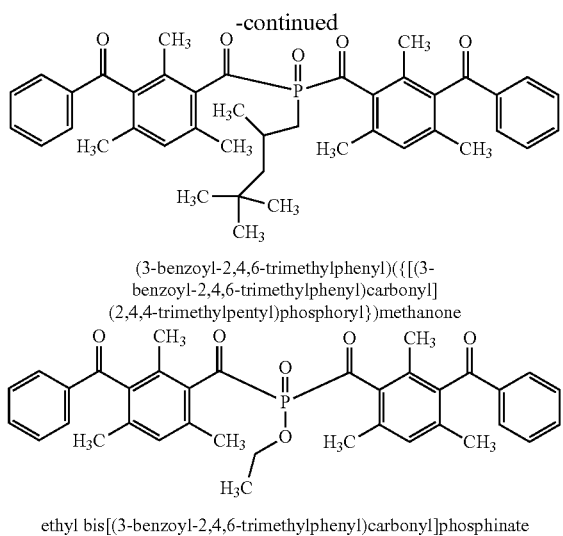

(3-benzoyl-2,4,6-trimethylphenyl)({[(3-benzoyl-2,4,6-trimethylphenyl)carbonyl](2,4,4-trimethylpentyl)phosphoryl})methanone ethyl bis[(3-benzoyl-2,4,6-trimethylphenyl)carbonyl]phosphinate

16. A process according to claim 1, wherein said photoactive oxide is selected from:
(3-benzoyl-2,4,6-trimethylphenyl)(diphenylphosphoroso)methanone Ethyl[(3-benzoyl-2,4,6-trimethylphenyl)carbonyl](phenyl)phosphinate Methyl[(3-benzoyl-2,4,6-trimethylphenyl)carbonyl](phenyl)phosphinate (3-benzoyl-2,4,6-trimethylphenyl)({[(3-benzoyl-2,4,6-trimethylphenyl)carbonyl](phenyl)phosphoryl})methanone.

17. A process according to claim 1, wherein said photoactive oxide is:

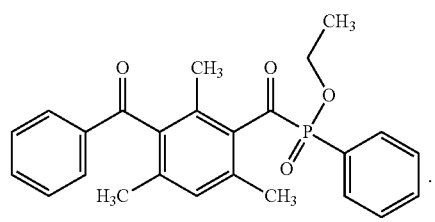

ethyl [(3-benzoyl-2,4,6-trimethylphenyl)carbonyl](phenyl)phosphinate

* * * * *